2,765,296

POLYMERS OF BUTADIENE DIMER EPOXIDES

Franklin Strain, Barberton, Ohio, assignor, by mesne assignments, to Columbia-Southern Chemical Corporation, Pittsburgh, Pa., a corporation of Delaware No Drawing. Application December 8, 1950,
Serial No. 199,915

12 Claims. (Cl. 260—85.7)

This application relates to novel polymers (including copolymers) of an epoxide of butadiene dimer. Such dimer has the probable structure:

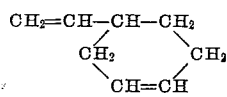

This compound frequently is called 4-vinyl cyclohexene.

According to the present invention, it has been found that desirable polymers may be prepared by polymerizing a mono- or diepoxide of 4-vinyl cyclohexene. Such polymers may be prepared by adding a catalyst to the epoxide which catalyst is capable of polymerizing an epoxy group and/or vinyl group and heating the catalyzed mono- or diepoxide to form polymers including copolymers and homopolymers of the epoxides. These polymers are formed by virtue of the polymerizing character of the epoxy and vinyl groups.

The monoepoxide is capable of polymerizing by means of the epoxy group to form an unsaturated high molecular weight polymer which contains polymerizable vinyl groups. These vinyl groups may then be polymerized by means of peroxides such as benzoyl peroxide or other peroxide catalysts capable of effecting polymerization of unsaturated olefinic groups. Metallic salt driers such as cobalt, manganese, or lead salts may be used to assist in this polymerization. The resulting polymerization of these unsaturated groups converts the soluble polymer formed by the polymerization of the epoxy group to a substantially insoluble polymer probably of 3-dimensional structure.

The diepoxy compound is capable of polymerizing by virtue of the existence of both epoxy groups and therefore polymerization of this compound results ultimately in the formation of a substantially insoluble infusible polymer. Both of these materials are capable of use in laminated and clear cast resinous products. The polymerization of the epoxy group is effected by the use of various catalysts such as sodium or potassium hydroxides, stannic chloride, zinc chloride, strontium oxide, aluminum chloride, iron chloride, boron trifluoride, dimethylaminoethanol or other catalysts such as have been found useful in the polymerization of ethylene oxide.

It will be noted that the catalysts used for polymerization of the epoxy group differ from the oxygenated or peroxy catalysts which may be used for the polymerization of olefinic groups and that the epoxy groups do not tend to polymerize under the influence of the oxygenated or peroxy catalysts. Consequently it is also possible in the case of the 4-vinyl cyclohexene 1,2-chlorohydrin compound to polymerize the vinyl group by virtue of olefinic polymerization using a catalyst such as oxygen, or a peroxide, and thereafter if desired to polymerize the resulting polymer and convert it to an essentially 3-dimensional state by use of one of the epoxide polymerization catalysts listed above.

Novel copolymers of the butadiene dimer epoxides may be formed. The epoxides may be polymerized with organic 1,2-epoxide compounds which contain up to 10 carbon atoms and which contain a polymerizable ethylene oxide or 1,2-epoxy group, such as styrene oxide, ethylene oxide, propylene oxide butene-2 oxide, isobutylene oxide, butadiene monoxide, chloroprene monoxide, isoprene oxide, cyclopentene oxide, cyclohexene oxide, glycidol, beta-methyl glycidol, 3,4-epoxy butanol, glycidol esters and ethers such as glycidol acrylate, glycidol methacrylate, glycidol maleate, glycidol crotonate, or glycidol allyl ether, glycidol methallyl ether, chloroallyl ether of alpha-ethyl glycidol, etc., to form copolymers having an ether linkage —R—O—R—O—X where R comprises radicals of the 1,2-epoxides disclosed above and butadiene dimer epoxides and X indicates the number of such polymerizable groups, usually being greater than 5.

When the epoxide polymerized with the butadiene dimer peroxide is a polymerizable unsaturated 1,2-epoxide compound such as butadiene monoxide, glycidol methacrylate, etc., the above copolymer will contain unsaturated polymerizable olefinic linkages. Likewise, when butadiene dimer monoepoxide is copolymerized with these polymerizable epoxides, the unsaturated polymerizable vinyl group of the dimer epoxide is present in the copolymer. Hence as disclosed above, these copolymers may be further polymerized by virtue of olefinic polymerization using a peroxide polymerization catalyst such benzoyl peroxide, tertiary butyl hydroperoxide, cyclohexyl hydroperoxide, acetyl peroxide, lauroyl peroxide, etc. to effect such further polymerization and to convert the copolymer to an essentially 3-dimensional copolymer if the three dimensional state has not already been reached. Such olefinic polymerization may be carried out with other polymerizable vinylic type compounds of the type described below.

The monoepoxides may be copolymerized with polymerizable ethylenically unsaturated compounds which are free from conjugation with respect to carbon and which contain a negative group attached to an ethylenic group capable of activating the polymerizable character of the ethylenic group such as:

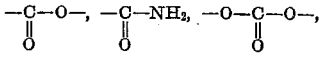

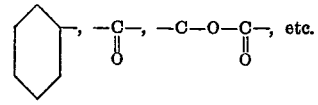

Compounds which contain one or more vinyl groups,

are contemplated for this purpose. Monofunctional compounds which contain but a single polymerizable ethylenic group include acrylamide, vinyl chloride, vinylidene chloride, acrylic acid, methacrylic acid, alpha chloro-acrylic acid and esters of such acids, particularly the methyl and ethyl esters such as methyl methacrylate, methyl acrylate, etc., methyl alpha chloro-acrylate or the corresponding ethyl, propyl or similar esters, styrene, alpha methyl styrene, alpha methyl paramethyl styrene or other polymerizable chloro, ethyl or methyl substituted styrenes or like aralkene, vinyl acetate, itaconic imide, acrylonitrile, vinyl methyl ketone, vinyl methyl or butyl ether, allyl acetate, allyl carbamate, etc.

Polyfunctional vinylic type compounds suitable for copolymerizing with butadiene dimer monoepoxide are the monohydric esters of an unsaturated monohydric alcohol and unsaturated monocarboxylic acid containing a vinyl group in which one carbon atom of the vinyl group is the second carbon atom from an ester linkage including esters of vinyl alcohol, allyl alcohol, methallyl alcohol, 2-chloro-allyl alcohol and equivalent alcohols with saturated and unsaturated acids and/or esters of acrylic and methacrylic and like monocarboxylic acids with saturated and unsaturated alcohols containing up to about 5 carbon atoms. By "ester linkage" is meant the group

having an oxygen atom adjacent to a carbonyl group.

Polyfunctional compounds containing two or more of such

groups are contemplated and include divinyl benzene, trivinyl benzene polyesters of the above mentioned unsaturated monohydric alcohols and dicarboxylic and polycarboxylic acids including diallyl maleate, diallyl fumarate, diallyl phthalate, diallyl succinate, diallyl adipate, diallyl sebacate, diallyl itaconate, diallyl carbonate, diallyl azelate, diallyl pimelate or the corresponding methallyl, vinyl or like unsaturated alcohol esters or corresponding esters of a polyhydroxy compound and allyl or like acid carbonate such as diethylene glycol bis (allyl carbonate) or like compound disclosed or suggested in U. S. Letters Patent No. 2,385,930. Also contemplated are the esters of the above mentioned unsaturated monohydric alcohols with the above mentioned monocarboxylic acids such as allyl acrylate, allyl methacrylate or vinyl acrylate or the polyhydric alcohol polyesters of such acids, such as ethylene glycol dimethacrylate, ethylene glycol, diacrylate, etc. Moreover, copolymers of the corresponding ethers of the above unsaturated alcohols such as dimethallyl ether, diallyl ether, divinyl ether may be prepared.

When the butadiene dimer monoepoxide is polymerized with the vinylic type monomers disclosed above in the presence of a catalyst capable of effecting polymerization of unsaturated olefinic groups, the copolymer thereby formed contains polymerizable epoxy groups. These groups may then be further polymerized by use of one of the expoxide polymerization catalysts listed above to convert the copolymer to an essentially 3-dimensional state. Such further epoxide polymerization can be carried out with other polymerizable 1,2-epoxide compounds which contain a polymerizable ethylene oxide or 1,2-epoxy group such as those listed above. These copolymers are capable of a wide variety of uses, being of use principally in laminated and cast resinous products.

The amount of butadiene dimer epoxide which is polymerized with the epoxy or vinyl compounds disclosed above varies from 5 to 95 percent by weight of the polymerizable mixture. This amount will vary in part according to the comparative activity of the vinyl and epoxy compounds and the type of copolymer desired. The amount of epoxy and/or vinyl compound polymerized with the butadiene dimer epoxide varies from 5 to 95 percent of the coplymer produced.

The butadiene dimer epoxides herein contemplated may be prepared by reaction of butadiene dimer with an aqueous solution of hypochlorous acid to form the corresponding chlorohydrin and subsequently converting the chlorohydrin to the epoxide. When hypochlorous acid is reacted with butadiene dimer both mono- and dichlorohydrin derivatives are produced depending upon the amount of hypochlorous acid used per mole of butadiene dimer. Similarly, when the chlorohydrin is converted to the epoxide both mono- and diepoxy compounds may be prepared depending upon whether the mono- or dichlorohydrin is used as the source material. For example, when 1 mole of hypochlorous acid is reacted with 1 mole of butadiene dimer the monochlorohydrin is formed. All evidence appears to indicate that HOCl in this case, adds mainly to the unsaturated group in the cyclohexene ring thus forming the 4-vinyl cyclohexene 1,2-chlorohydrin. The exact location of the chlorine and hydroxy radicals in this chlorohydrin is somewhat uncertain but it appears that mixtures of both isomers are produced.

When the monochlorohydrin is reacted with alkali or other basic agent such as sodium hydroxide, the corresponding 4-vinyl 1,2-epoxy cyclohexane is produced.

Dichlorohydrins and diepoxy derivatives are secured when the butadiene dimer is reacted with substantially 2 moles of HOCl per mole of butadiene. In such a case the HOCl adds on to both unsaturated groups of the dimer to form the corresponding dichlorohydrin probably as a mixture of all of the four possible isomers. When this chlorohydrin or mixture of chlorohydrins is reacted with a basic agent such as sodium hydroxide in amount sufficient to take up the entire quantity of chlorine in the chlorohydrin groups the corresponding diepoxide having the structure indicated below is secured. Moreover, mixed epoxy chlorohydrins may be obtained by use of a basic agent in amount insufficient to react with all of the chlorine in the chlorohydrin radicals in such a case a compound containing an epoxy and a chlorohydrin group being produced.

The reaction of the butadiene dimer with hypochlorous acid may be conveniently effected by mixing an aqueous solution of hypochlorous acid with the butadiene dimer in the desired concentrations and stirring the mixture for a time sufficient to permit the reactants to react. In general, it is found desirable to conduct this operation at a temperature below room temperature since side reactions tend to occur at elevated temperatures. Usually it is preferred to maintain the reaction at approximately 0 to 15° C. although lower temperatures may re resorted to if desired. Agitation of the reaction mixture for two or several hours is generally sufficient to insure complete reaction.

The chlorohydrin mixture thus obtained may then be treated by conventional means for isolation of the resulting chlorohydrin. For example, the reaction mixture may be saturated with a suitable salt such as sodium sulfate or sodium chloride in order to salt out the chlorohydrin from the aqueous solution and the resulting chlorohydrin separated as an oil from the immiscible salt solution. In order to insure substantially complete recovery of the chlorohydrin it is generally desirable to extract the reaction mixture or at least the aqueous phase with a water immiscible solvent such as ether and frequently the entire reaction mixture is so extracted. The ether extract may then be dried over a suitable dehydrating agent and heated in a partial vacuum to remove ether and other low boiling materials. The remaining liquid is the crude chlorohydrin of the butadiene dimer. This product may be fractionated in order to recover the chlorohydrin in a more highly purified state.

The chlorohydrins produced in accordance with this invention are high boiling liquids which generally darken during the distillation or purification process. Consequently, they are frequently colored or at least possess a yellow cast. Unless purified by especially careful fractionation the compounds are frequently contaminated with small amounts of other chloro derivatives and/or polymeric ethers to a small degree.

The production of the epoxides, as previously stated, is accomplished by reaction of the resulting chlorohydrins with a suitable basic agent. This process normally is conducted in aqueous medium using a basic agent such as sodium hydroxide. However, numerous other basic agents capable of removing chlorine from chlorohydrin groups such as other alkali metal hydroxides including potassium or lithium hydroxide, alkaline earth metal hydroxides such as calcium, magnesium, or barium hydroxide or the corresponding carbonates or bicarbonates of the above elements such as sodium carbonate or sodium bicarbonate or organic basic agents. Sufficient basic agent is added to remove the chlorine from the chlorohydrin group or groups and in general some excess, frequently 10% or more, of the basic agent is used in order to insure substantially complete reaction. The process is carried out simply by mixing the reactants or by adding one to the other over a period of time and stirring the reaction mixture while periodically titrating the mixture for chloride ion. When the chloride ion concentration reaches a substantially constant level the reaction is deemed to be complete.

The crude reaction mixture containing the expoxides is then extracted with a suitable water immiscible solvent such as ether and the ether extract dried by suitable dehydrating agents such as sodium sulfate, magnesium sulfate, etc. and topped to remove low boiling fractions. The resulting epoxide may then be fractionally distilled in order to separate the pure or substantially pure epoxide. These epoxides are high boiling liquids which are slightly soluble in water and miscible with organic solvents such as ether, acetone, xylene, etc. The production of the chlorohydrins and epoxy compounds herein contemplated may be illustrated by the following examples:

*Example I*

One mol of 4-vinyl cyclohexene (butadiene dimer) is placed in a three liter three neck flask equipped with a dropping funnel, a stirrer and thermometer and the flask is placed in a salt-ice bath. One mol of HOCl as an aqueous solution containing 2.88 grams of HOCl per 100 cc. of solution is added slowly through the dropping funnel over a period of 2¼ hours while the mixture is stirred. During the addition the temperature of the mixture is 4 to 6° C.

Excess HOCl is destroyed with sodium sulfite and the resulting mixture is saturated with sodium sulfate and extracted with two 200 cc. portions and one 100 cc. portion of ether. The ether extract is dried over magnesium sulfate, the ether distilled off and the product distilled at 3–4 mm. pressure yielding the monochlorohydrin of butadiene which has one or both of the probable structures:

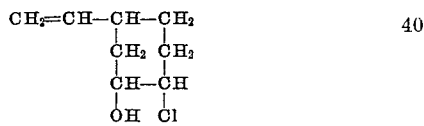

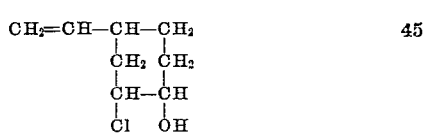

This product is a viscous liquid which boiled at 87–90° C. at 4 mm. pressure and has an index of refraction $n^{20}D$ 1.5002. It is sparingly soluble in water and miscible with organic solvents such as ether.

4-vinyl cyclohexene 1,2-monochlorohydrin, 32.1 grams prepared as above described, is stirred with a 10% excess of 20% by weight aqueous sodium hydroxide at 24 to 26° C. and stirring is continued until the chloride ion concentration becomes constant as indicated by periodic titration for chloride ion. The resulting mixture is extracted with three 50 cc. portions of ether and the ether extract is dried over magnesium sulfate, volatile material removed by distillation at 25° C. and 40 mm. pressure and the residue finally fractionally distilled to recover the 4-vinyl 1,2-epoxy cyclohexane.

This product is a clear slightly yellow liquid which boils at 77 to 85° C. at 33 to 36 mm. pressure. The index of refraction of the liquid is 1.4706 at 20° C. This liquid is not entirely pure since small amounts of chloro derivatives are present. The product has the probable structure:

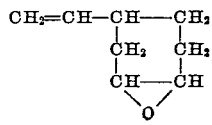

It is partially soluble in water and miscible with organic solvents such as ether.

The liquid polymerizes when heated in the presence of 0.2% by weight $SnCl_4$ at 90–100° C. for 72 hours to form a semi-solid polymer which is a mixture of low and high molecular weight polymers. The low molecular weight polymers may be separated by distillation if desired.

*Example II*

Fifty four grams of butadiene dimer (4-vinyl cyclohexene) are added drop by drop to 4 liters of 14% hypochlorous acid while stirring the mixture. The addition takes place over a period of one hour and during this period and for an hour thereafter, the temperature of the mixture is maintained at 5 to 8° C. Thereafter residual HOCl is destroyed by adding sufficient sodium sulfite, the solution is saturated with sodium sulfate and the product is extracted with two 500 cc. portions and one 300 cc. portion of ether. The ether solution is dried over magnesium sulfate, the ether evaporated and the residue topped by heating at 100° C. and 35 mm. pressure for two hours. The residue is a viscous yellow liquid which is a mixture containing a small amount of polymeric ether and quantities of the chlorohydrin having the probable structures:

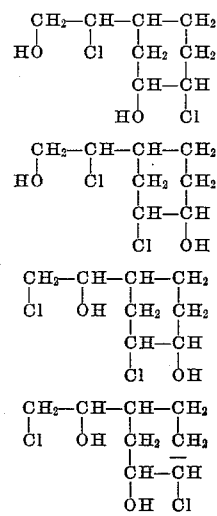

The product is partially soluble in water and is soluble in ether and other organic solvents.

Fifty-one and one-half grams of butadiene dimer dichlorohydrin prepared as above is suspended in 50 cc. of water and an aqueous solution of 20.3 grams of sodium hydroxide dissolved in 150 grams of water is stirred into the suspension. Stirring is continued for a total period of 75 minutes during which time the temperature of the mixture is maintained at 22 to 25° C. Samples of the solution are titrated for chloride ion at short intervals and after 75 minutes the chloride ion concentration reaches a substantially constant figure.

The reaction mixture is extracted with two 100 cc. portions and one 50 cc. portion of ether and the extracts combined. The ether is boiled off and the residue topped at 100° C. at 38 mm. pressure.

This product is distilled through a six inch column and a yellow liquid fraction which collects at 76 to 80° C. at a pressure of 1.5 to 2 mm. and which has an index of refraction $n_D^{20}$ 1.4787 is secured. This product is the diepoxide of butadiene dimer and is understood to have the structure:

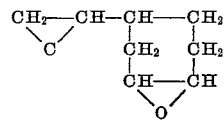

The diepoxide is slightly water soluble and is miscible with organic solvents such as ether.

This diepoxide polymerizes to form a hard essentially infusible gel when heated in the presence of 0.01% by weight stannic chloride at 90°–100° C. for 72 hours. These polymers are insoluble in water or organic solvents.

*Example III*

One milliliter of butadiene dimer diepoxide [1,2-epoxy-4-(epoxyethyl) cyclohexane] as prepared in Example II is added to one milliliter of styrene oxide and 0.06 milliliter of a one percent solution of stannic chloride (one milliliter of stannic chloride dissolved in 99 milliliters of carbon tetrachloride) and the mixture is heated at a temperature of about 70° C. Gelation occurs within 15 minutes after the heating is begun. After 68 hours heating at 70° C. and 4 hours at 115° C. a clear, solid polymer is formed.

*Example IV*

Equal parts by volume of propylene oxide and butadiene dimer diepoxide [1,2-epoxy-4-(epoxyethyl) cyclohexane] are mixed together in the presence of 3 percent by volume (based upon the total volume of polymerizable components) of a one percent solution of stannic chloride in carbon tetrachloride. The mixture is heated in a sealed tube at a temperature of 70° C. for 72 hours. A solid polymer is formed.

*Example V*

Fifty parts by volume of butadiene dimer monoepoxide is added to fifty parts by volume of methyl methacrylate and one part by weight of benzoyl peroxide added. This mixture is heated in a sealed tube at a temperature of 75° C. for 72 hours. A polymer is formed. This polymer is dissolved in chloroform and two parts by volume of a one percent solution of stannic chloride in chloroform added. The solution is dried in a glass plate in a carbon dioxide atmosphere and the resulting film heated at a temperature of 100° C. for two hours. A solid 3-dimensional polymer is formed.

*Example VI*

Sixty parts by volume of butadiene dimer monoepoxide is mixed with forty parts by volume of butadiene monoxide, and three parts by volume of a one percent solution of stannic chloride in carbon tetrachloride added. The mixture is heated at a temperature of 70° C. for 48 hours and at 100° C. for 4 hours. To this product is added three parts by weight of benzoyl peroxide and one-tenth part of cobalt acetate. The resulting mixture is heated for 48 hours at a temperature of 70° C. and a solid infusible 3-dimensional copolymer is formed.

*Example VII*

Fifty parts by volume of butadiene dimer monoepoxide is added to fifty parts by volume of butadiene monoxide and three parts by volume of a one percent solution of stannic chloride in carbon tetrachloride added. The mixture is heated at a temperature of 70° C. for 48 hours. To this product is added one part by weight of benzoyl peroxide and thirty parts by volume of styrene. This mixture is heated for 48 hours at a temperature of 60° C. and a solid infusible 3-dimensional copolymer is formed.

*Example VIII*

Forty parts by volume of butadiene dimer monoepoxide is added to sixty parts by volume of glycidol methacrylate and three parts by volume of a one percent solution of boron trifluoride in carbon tetrachloride added. The mixture is heated at a temperature of 70° C. for 72 hours. To this product is added two parts by weight of benzoyl peroxide and the mixture is heated for an additional 72 hours at a temperature of 70° C. A solid infusible 3-dimensional copolymer is formed.

Although the present invention has been described with reference to the specific details of certain embodiments thereof it is not intended that such details shall be regarded as limits upon the scope of the invention except insofar as included in the accompanying claims.

This application is a continuation-in-part of my co-pending application, Serial No. 696,374, filed September 11, 1946, now abandoned.

I claim:

1. The homopolymer of the compound:

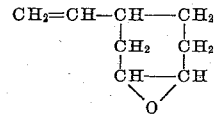

2. The homopolymer of the compound:

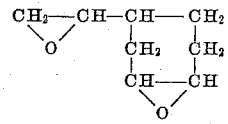

3. A polymer of 4-vinylcyclohexene monoepoxide containing epoxy groups and consisting solely of the recurring structural units.

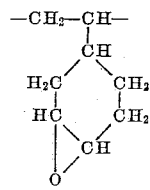

4. A polymer of 4-vinylcyclohexene monoepoxide consisting solely of the recurring structural units

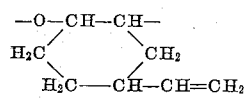

5. An epoxy-containing copolymer of 4-vinylcyclohexene monoepoxide and at least one polymerizable ethylenically unsaturated epoxy-free compound, said copolymer containing from 5 to 75 percent by weight of said 4-vinylcyclohexene monoepoxide polymerized through the vinyl group and retaining the epoxide group intact.

6. An epoxy-containing copolymer of 4-vinylcyclohexene monoepoxide and a polymerizable epoxy-free vinyl monomer, said copolymer containing from 5 to 50 percent by weight of said 4-vinylcyclohexene monoepoxide polymerized through the vinyl group and retaining the epoxide group intact.

7. An epoxy-containing copolymer of 4-vinylcyclohexene monoepoxide and a polymerizable epoxy-free vinyl ester, said copolymer containing from 5 to 50 percent by weight of said 4-vinylcyclohexene monoepoxide polymerized through the vinyl group and retaining the epoxide group intact.

8. An epoxy-containing copolymer of 4-vinylcyclohexene monoepoxide and a polymerizable epoxy-free vinyl ester of an alkanoic monocarboxylic acid, said copolymer containing from 5 to 50 percent by weight of said 4 - vinylcyclohexene monoepoxide polymerized through the vinyl group and retaining the epoxide group intact.

9. An epoxy-containing copolymer of 4-vinylcyclohexene monoepoxide with a polymerizable epoxy-free vinyl halide, said copolymer containing from 5 to 50 percent by weight of said 4-vinylcyclohexene monoepoxide polymerized through the vinyl group and retaining the epoxide group intact.

10. An epoxy-containing copolymer of 4-vinylcyclohexene monoepoxide with vinyl acetate, said copolymer containing from 5 to 50 percent by weight of said 4-vinylcyclohexene monoepoxide polymerized through the vinyl group and retaining the epoxide group intact.

11. An epoxy-containing copolymer of 4-vinylcyclohexene monoepoxide with vinyl chloride, said copolymer containing from 5 to 50 percent by weight of said 4- vinylcyclohexene monoepoxide polymerized through the vinyl group and retaining the epoxide group intact.

12. A polymer of an epoxide of 4-vinylcyclohexene selected from the group consisting of homopolymers of 4-vinylcyclohexene epoxides and copolymers formed by olefinic polymerization of 4-vinylcyclohexene monoepoxide and a polymerizable ethylenically unsaturated epoxy-free compound.

References Cited in the file of this patent
UNITED STATES PATENTS

| | | |
|---|---|---|
| 2,503,873 | Hornibrook | Apr. 11, 1950 |
| 2,527,806 | Foster | Oct. 31, 1950 |
| 2,555,500 | Morehouse | June 5, 1951 |